Oct. 7, 1969 K. E. KOLB ET AL 3,471,356
GLASS AND PLASTIC LAMINATES
Filed Sept. 18, 1964

INVENTORS
KENNETH E. KOLB
CHARLES L. SCHREIBER
BY
*Sughrue, Rothwell, Mion, Zinn & Macpeak*
ATTORNEYS United States Patent Office 3,471,356
Patented Oct. 7, 1969

3,471,356
GLASS AND PLASTIC LAMINATES
Kenneth E. Kolb and Charles L. Schreiber, Corning, N.Y., assignors to Corning Glass Works, Corning, N.Y., a corporation of New York
Filed Sept. 18, 1964, Ser. No. 397,437
Int. Cl. D06n 7/04; B32b 27/40
U.S. Cl. 161—160                                    7 Claims

ABSTRACT OF THE DISCLOSURE

The provision of a glass and plastic laminate having high impact resistance, low weight and color stability upon exposure to light and heat comprising a thin glass sheet strengthened by low-temperature ion-exchange bonded to at least one surface of an expanded, cellular synthetic resin substrate.

---

Figure 1:
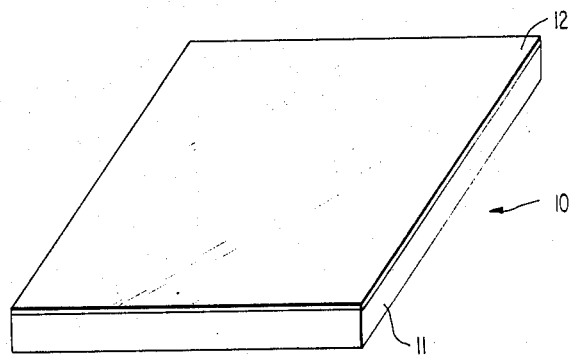

This invention relates to laminated structures comprising bonded glass and plastic layers. More particularly, this invention relates to laminates comprising layers of thin glass and synthetic resin foam.

Lightweight translucent or opaque panels have become extremely important in modern architecture. An early type of lightweight panel was formed from thin sheets of plastic bonded to resilient or rigid synthetic resin foams. These panels have not proven to be satisfactory for a number of reasons, e.g., many of the plastics tend to discolor after prolonged exposure to heat or light. Furthermore, plastics are vapor permeable which makes them unsuitable for use in certain applications.

More recently, conventional glass has been bonded to resilient substrates to form structural panels. Although the glass has high resistance to heat and light discoloration, and a vapor permeability of essentially zero, these panels have certain other disadvantages. The most important drawback of glass surfaced panels is the low impact resistance of the glass. Furthermore, such plate glass panels are extremely heavy and their weight increases the cost of shipping and installing the panel.

Accordingly, the primary purpose of the present invention is to provide improved laminates of glass and plastic which are characterized by high impact resistance, low weight and color stability upon exposure to light and heat.

In general, according to the present invention, a laminated structure is provided which comprises a foamed synthetic resin core or substrate and a thin sheet of glass, strengthened by low-temperature ion-exchange, bonded to at least one surface of the foamed resin core. Sheets of thin glass of the present type may be bonded to both surfaces of the foam resin core to provide a panel surfaced with glass on both sides.

The thin glass sheets which are used in the laminates of the invention are formed of glass which has been strengthened by low-temperature ion-exchange. Glasses of this type are formed by replacing the surface ions in the glass sheet with larger ions, the replacement being accomplished by low-temperature ion-exchange. This produces compression on the surface of the glass, similar to that produced by chill tempering, which strengthens the glass. Glasses of this type are more resistant to breakage and have greater flexural strength, even in thin sheets, than do conventional glasses.

The formation of glass strengthened by low-temperature ion-exchange is fully described in copending U.S. patent applications Ser. Nos. 181,886 and 181,887, both filed Mar. 23, 1962, and both now abandoned.

Broadly, the method described in Ser. No. 181,887 involves thermochemically exchanging an alkali ion within a surface layer of glass with an ion from an external source, wherein the glass ion-external source exchangeable ion pair is selected from the group consisting of alkali metal ion-larger monovalent ion pairs and sodium-hydrogen, wherein the glass is an alkali aluminosilicate glass composed essentially of an alkali metal oxide, at least 5% $Al_2O_3$, and the balance silica and optionally containing compatible glass ingredients in amount not exceeding about 20%.

The improved thermochemical ion exchange is effected by bringing a preformed alkali aluminosilicate glass article into intimate contact with a material containing thermally exchangeable ions at an elevated temperature. During the ensuing thermally induced ion exchange, ions from the glass are replaced by a corresponding number of ions from the contacting material to maintain an electrical balance in the glass.

The invention involved in Ser. No. 181,886 is a method of producing a strengthened glass article which comprises forming the article from a lithium silicate glass, and thermochemically exchanging lithium ions from a surface layer of the glass with larger monovalent ions from a surface layer of the glass with larger monovalent ions from an external source in contact with the glass for a sufficient time to produce a compressively stressed glass layer that imparts increased abraded strength to the article. Correspondingly, the article of the invention is a lithium silicate glass article having a surface layer in which a portion of the lithium ions have been replaced by larger monovalent ions to produce a compressively stressed layer such that the abraded strength of the article is increased.

The thermochemical ion exchange is effected by bringing a preformed lithium silicate glass article into intimate contact with a material containing thermally exchangeable ions at an elevated temperature. During the ensuing thermally induced ion exchange, lithium ions from the glass are replaced by a corresponding number of ions from the contacting material to maintain an electrical balance in the glass. The depth of this ion exchange or replacement increases both with time and temperature thus increasing the depth of the compressively stressed glass surface layer formed by this ion exchange or replacement, providing the temperature is not so high as to permit stress relaxation.

The glass sheets used in this invention have a thickness of between 0.005 and 0.150 inch, with sheets having a thickness of between 0.020 and 0.080 inch being preferred.

The impact resistance of the laminates of this invention is at a maximum when the surfaces of the glass sheets employed are free of all scratches and discontinuities. Preferably, a smooth surfaced "as drawn" glass is used. Alternatively, the surface of the glass can be ground or ground and polished, by techniques well known in the art, to make it relatively free of scratches. However, as grinding and polishing leaves some surface scratches regardless of how fine or to what degree it is carried out, in a preferred embodiment "as drawn" glass is used.

A wide variety of expanded, cellular, synthetic resins can be used as the core material or substrate in the laminates of this invention. Depending upon the end use of the panel, the core or substrate material may be rigid, semiflexible, or flexible. Suitable core materials include the homopolymers and copolymers of polystyrene such as styrene-acrylic, the homopolymers and copolymers of alkyl or halo-substituted polystyrene, and homopolymers and copolymers of various other synthetic resins, such as polyvinyl chloride, polyvinylidene chloride, polyacrylic esters, polymehtacrylic esters, polyacrylonitrile, polyolefins, such as polyethylene and polypropylene, epoxies, silicones, and polyurethane. Foams formed from natural or synthetic rubbers can also be used. Therefore, as used in this specification and the appended claims, the term "expanded, cellular, synthetic resin" is intended to include both synthetic resins and natural elastomers, such as rubber. Excellent laminates have been formed using cellular synthetic resin foams formed of polystyrene, polyethylene and polyurethane. The synthetic resin foam used should have a Shore A hardness of less than about 80.

The laminated structures of the present invention are illustratively shown in the accompanying drawings.

Figure 2:
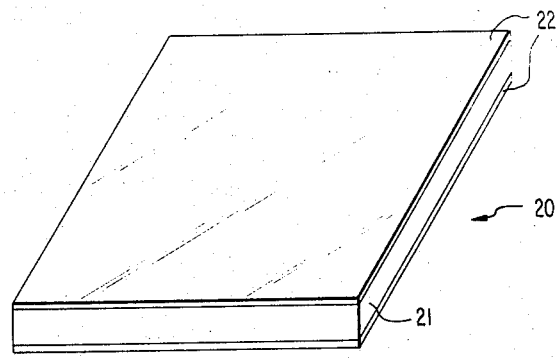

In the drawings:

FIGURE 1 is a perspective view of a laminated panel in accordance with the invention, and FIGURE 2 is a perspective view of another such laminated panel.

Referring to FIGURE 1 of the drawing, there is shown a laminated panel 10 comprising a relatively thick core or base layer or element 11 of foamed synthetic resin to one surface of which is bonded a thin sheet 12 of glass which has been strengthened by low-temperature ion-exhange. In FIGURE 2, a laminate 20 is shown in which both surfaces of synthetic resin foam core 21 are bonded to thin sheets 22 of strengthened glass.

The laminates of this invention are formed by adhesively uniting the glass with the synthetic resin foam or by contacting the glass with an expandable synthetic resin composition which is then foamed in situ. The foam can be surfaced on both sides with the glass, as shown in FIGURE 2. Generally, satisfactory laminates are prepared by coating the foam with a thin layer of adhesive, contacting the glass with the adhesive coated surface of the foam, and maintaining the foam and the glass in contact until the adhesive has set. It is not necessary to coat the entire surface of the foam with adhesive. Usually a thin line of adhesive proximate to the outer edges of the foam substrate will suffice. The specific adhesive chosen to laminate the thin glass sheets to the foam core is not critical. A wide variety of adhesives may be used. Examples of adhesives which have been found to be satisfactory are thermoplastics, such as polyvinyl acetate, acrylics, polyvinyl butyral, and polyvinyl ether; thermosetting resins, such as epoxy and alkyd; elastomeric materials, such as natural rubber, synthetic rubber, and silicone; resin blends, such as phenolic-polyvinyl butyral. Naturally, the length of time the glass must be maintained in contact with the foam will depend upon the particular adhesive used and will vary from a few minutes to many hours with different adhesives.

Example I

A four-inch square block of polystyrene foam having a thickness of ⅞ inch and having a density of one pound per cubic foot is coated on both faces with a thin layer of Bondmaster P561 adhesive, a polyvinyl ether adhesive. A sheet of low-temperature non-exchanged glass having a thickness of 0.05 inch, which has been ground and polished, is applied to each of the faces of the polystyrene foam and is maintained thereby means of spring clamps for about 10 minutes until the adhesive has set. The laminate which is formed is extremely resistant to breakage, as shown by the results of ball impact testing.

The ball impact tests were performed by supporting the laminate on three steel balls spaced 3 inches apart in a triangular pattern and repeatedly dropping a four-ounce steel ball from successively greater heights until breakage occurred. The laminate prepared in Example I broke upon impact with the ball dropped from a height in excess of 72 inches. In order to illustrate the improvement represented by the instant laminates, three laminates were prepared in a manner identical with that set forth in Example I except that sheets of 0.066 inch thick window glass were substituted for the low-temperature ion-exchanged glass used in Example I. The conventional glass laminates broke at impact with the ball dropped from heights of 6 inches, 18 inches, and 33 inches respectively.

In contrast to the rigid styrene foam used as the backing in Example I, laminates may be prepared using flexible foam cores.

Example II

A four-inch square block of polyurethane foam having a density of one pound per cubic foot and a thickness of ⅜ inch is coated on both faces with a thin layer of a resilient epoxy resin adhesive (Epi Rez 510 cured with Epi Cure 855). A ground and polished sheet of glass strengthened by low-temperature ion-exchange and having a thickness of 0.06 inch is applied to each of the faces of the polyurethane foam core and is maintained there by means of spring clamps for 16 hours until the resin has cured. A flexible laminate is obtained. By ball impact testing, it is found that the laminate does not break until the four-ounce steel ball is dropped from a height of 96 inches. Another sample prepared in a manner identical to that in Example II was resistant to breakage until the ball was dropped from a height of 10 feet.

A series of laminates are prepared by employing the technique set forth in Examples I and II. The foam backing and glass is varied in each case. Table I set forth the heights at which breakage occurred during ball testing to determine impact resistance.

TABLE I

| Sample | Glass | Glass Thickness, in. | Core | Core Thickness, in. | Adhesive [1] | Impact Height in Inches |
|---|---|---|---|---|---|---|
| A | Ground and polished | 0.06 | Beaded styrene [1 lb./cu. ft.] | ⅞ | F | 72 |
| B | do | 0.06 | do | ⅞ | F | >72 |
| C | Ground | 0.06 | do | ⅞ | G | 51 |
| D | do | 0.07 | Beaded styrene [2 lb./cu. ft.] | ⅞ | F | 72 |
| E | do | 0.07 | do | ⅞ | F | 45 |
| F | Ground and polished | 0.04 | Styrofoam [2 lb./cu. ft.] | 1 | C | 18 |
| G | Ground | 0.055 | Styrene-methyl methacrylate [1 lb./cu. ft.] | 1 | F | (2) |
| H | Ground and polished | 0.055 | Polyethylene [2 lb./cu. ft.] | 7/16 | P | 39 |

[1] See the following table:

| Type | Composition | Weight Ratio |
|---|---|---|
| C = rapid cure viscous epoxy | Epi Rez 510 cured with Epi Cure 87 | 100/20 |
| F = rapid cure thin epoxy | Epi Rez 504 cured with Epi Cure 87 | 100/20 |
| G = resilient epoxy | Epi Rez 510 cured with Epi Cure 855 | 100/50 |
| P = permanently flexible adhesive | Bondmaster P-561, a polyvinyl ether | |

[2] Foam breaks at 36.

The invention will be more fully appreciated in the light of the following detailed examples.

The foam cores may be pretreated to improve their resiliency.

Example III

Laminates are prepared in the manner described in Example I, except a compressed polystyrene foam ⅞ inch thick is used. This foam is prepared by subjecting rigid polystyrene foam having a density of one pound per cubic foot to a pressure of 6,000 p.s.i. for 1 minute, which makes the polystyrene more resilient. Three samples prepared from this compressed foam withstood a 72-inch impact of a four-ounce steel ball without breaking.

The laminated articles provided for by this invention have numerous structural and decorative applications. Due to their light weight and resistance to breakage, these laminates are superior to prior glass surfaced laminates. They are good thermal insulators, and can be used as translucent windows, window walls, ceiling or roof panels, and indoor partitions. They may also be used to provide relatively unbreakable, vapor impermeable table tops.

It will be obvious to those skilled in the art that various changes and modifications may be made in the present products as illustrated and described herein without departing from the spirit or scope of the invention as expressed in the following claims.

What is claimed is:

1. A high impact strength laminate of glass and plastic comprising a thin glass sheet adhesively bonded to at least one surface of an expanded, cellular, synthetic resin substrate, said glass sheet being a glass which has been strengthened by low-temperature ion-exchange.

2. The article of claim 1 wherein said glass sheet has a thickness of from 0.005 to 0.150 inch.

3. The article of claim 1 wherein said expanded, cellular, synthetic resin is a member selected from the group consisting of polystyrene, polyethylene, polyurethane, and styrene-methyl methacrylate.

4. The article of claim 1 wherein said expanded, cellular, synthetic resin has a Shore A hardness of less than about 80.

5. The article of claim 1 wherein a thin glass sheet is bonded to both surfaces of said expanded, cellular, synthetic resin substrate.

6. A high impact strength laminate of glass and plastic comprising a glass sheet adhesively bonded to an expanded, cellular, synthetic resin substrate, said glass being strengthened by low-temperature ion-exchange and having a thickness of from 0.005 to 0.150 inch, and said expanded, cellular, synthetic resin substrate having a Shore A hardness of less than about 80.

7. The article of claim 6, wherein said glass sheet has a thickness of from 0.020 to 0.080 inch.

References Cited

UNITED STATES PATENTS

| | | | |
|---|---|---|---|
| 3,357,876 | 12/1967 | Rinehart | 161—1 |
| 3,396,075 | 8/1968 | Morris | 161—199 |

ROBERT F. BURNETT, Primary Examiner

W. J. VAN BALEN, Assistant Examiner

U.S. Cl. X.R.

161—161, 164, 165, 184, 190; 156—99